March 20, 1934. G. H. LELAND 1,951,877
ELECTRIC MOTOR AND THE LIKE
Original Filed March 31, 1932 2 Sheets-Sheet 1
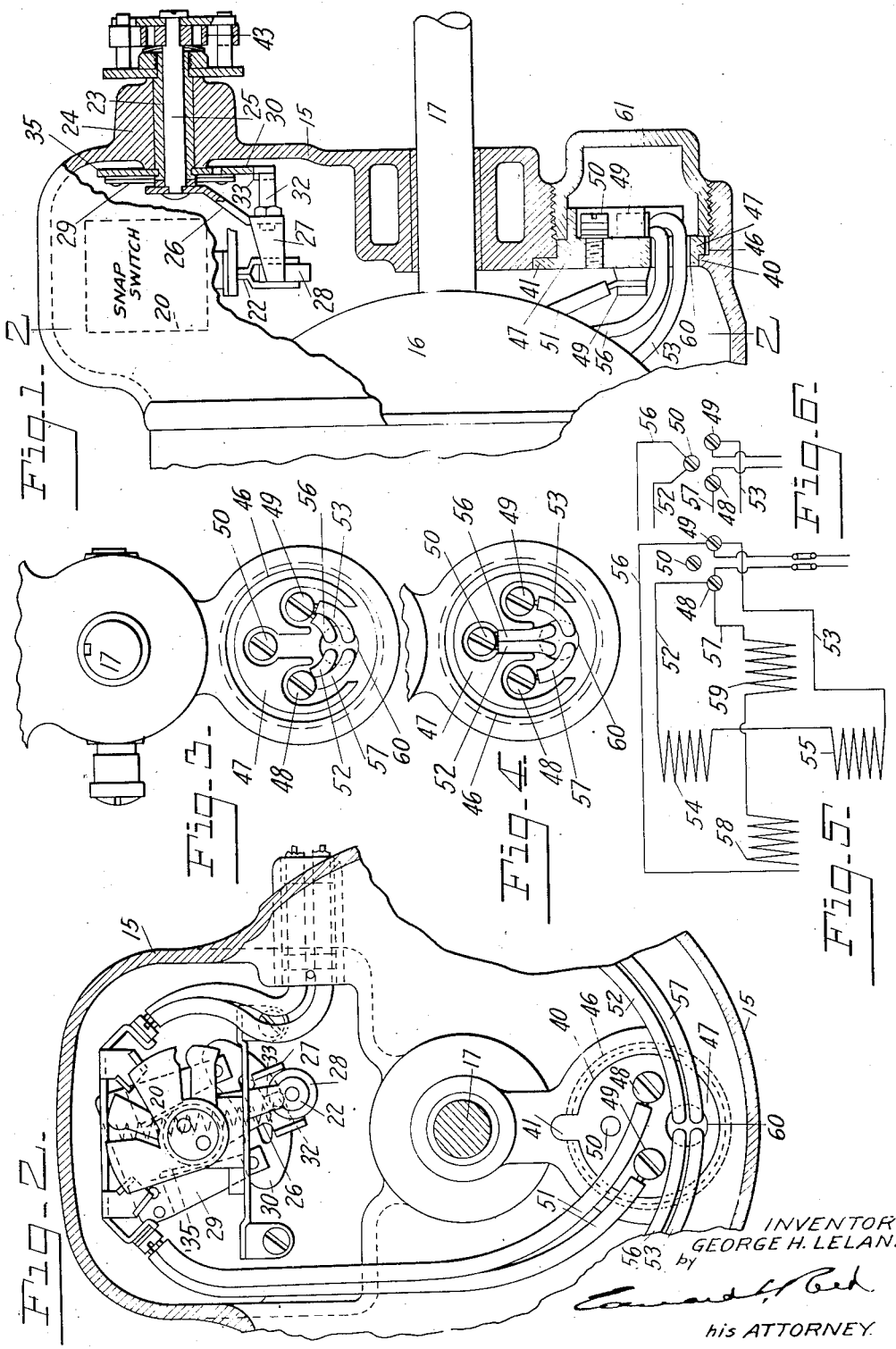

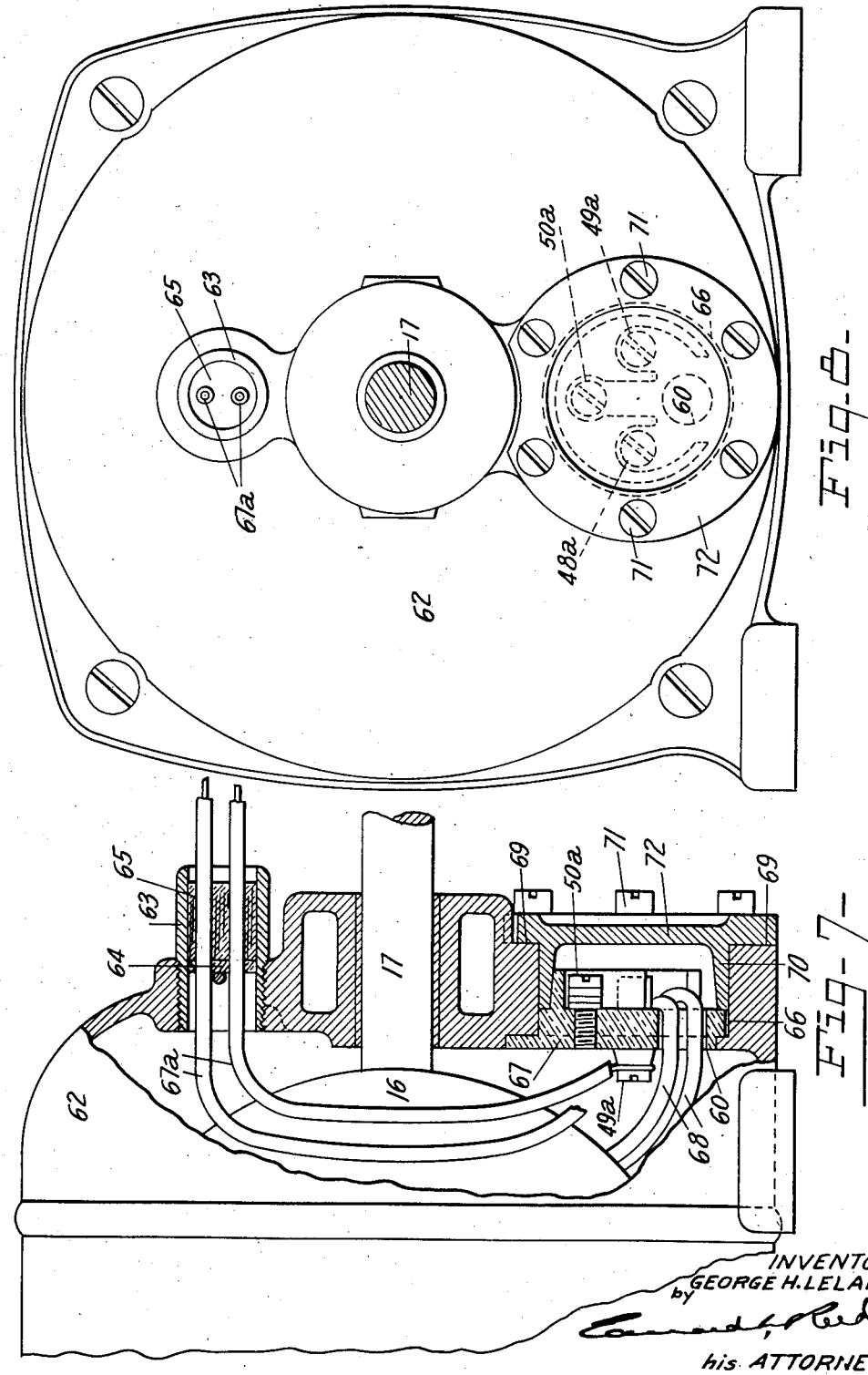

Patented Mar. 20, 1934

1,951,877

UNITED STATES PATENT OFFICE 1,951,877

ELECTRIC MOTOR AND THE LIKE

George H. Leland, Dayton, Ohio, assignor of one-half to The Leland Electric Company, Dayton, Ohio, a corporation of Ohio Continuation of application Serial No. 602,217, March 31, 1932. This application December 3, 1932, Serial No. 645,539

16 Claims. (Cl. 172—36)

This invention relates to electrical devices of that type in which the operating parts are enclosed in an explosion resisting or sealed casing, and more particularly to means for adjusting the circuits within the casing to enable the device to operate on different voltages. Various electrical devices are of such a construction that by a comparatively simple change in the circuits they may be caused to operate on different voltages but when the circuits are enclosed in a sealed casing it is often difficult to gain access thereto and the changing of the circuits involves much labor. For example, a repulsion-induction motor is usually so constructed that the primary circuits may be operated from the permanent line connections either in multiple or in series, thus adapting the motor for operation with either a current of 110 volts or a current of 220 volts.

When the motor is used in the presence of explosive gases or in a location where there is a possibility of explosive gases or inflammable liquids accumulating, as when it is used for operating a gasoline pump, it is important, and the underwriters require, that all operating parts and electrical connections shall be enclosed in a casing which is of such a character as to not only prevent gases from entering the casing but also to resist the force of an explosion within the casing. Such a casing as usually constructed renders access to the circuit connections within the same difficult and it is often necessary to partially dismantle the motor in order to change the connections.

One object of the invention is to provide an electrical device having a closed casing with means which are readily accessible from the exterior of the casing for changing the circuit connections within the casing.

A further object of the invention is to provide such a device with a casing having an opening through which the circuit connections are accessible and a removable closure for that opening, the casing and the closure for the opening being of an explosion resisting character.

A further object of the invention is to provide such a device with a terminal block having means for changing the circuit connections so arranged that it will be readily accessible from the exterior of the casing when a small closure is removed.

A further object of the invention is to provide such a device with an accessible terminal block which may be embodied therein at a small cost and without substantial change in the construction or arrangement of the other parts of the device.

Other objects of the invention will appear as the device is described in detail.

In the accompanying drawings Fig. 1 is a vertical section, partly in elevation, of one end of a motor showing my invention applied thereto; Fig. 2 is a transverse section taken on the line 2—2 of Fig. 1; Fig. 3 is a detail of the terminal block showing one arrangement of the leads thereon; Fig. 4 is a similar view of the terminal block showing another arrangement of the leads thereon; Fig. 5 is a circuit diagram showing the leads arranged as in Fig. 3; Fig. 6 is a diagram of a portion of the circuit showing the leads arranged as in Fig. 4; Fig. 7 is a vertical section, partly in elevation, showing a slightly modified form of the invention applied to a motor of a different type; and Fig. 8 is an end elevation of the motor shown in Fig. 7.

The present application is a continuation of the application filed by me March 31, 1932, Serial No. 602,217, in so far as the subject matter is common to both applications, and in the drawings I have illustrated two embodiments of the invention, one of which shows the invention applied to a motor of the kind shown and claimed in the above mentioned application and the other of which shows the invention applied to a motor of a slightly different construction. It will be understood, however, that the invention may take various forms and may be applied to motors or other devices of various kinds.

The particular motor shown in Figs. 1 and 2 comprises a casing 15 in which are mounted the field windings and the armature 16, the latter being carried by a shaft 17. The operation of the motor may be controlled by a switch of any suitable character but, in the present instance, the switch is mounted within the casing and may be controlled either automatically or manually. The switch may be of the usual or any suitable construction but is preferably of a snap action type, as shown at 20, and has a downwardly extending actuating arm 22 provided at its lower end with a roller 28. The switch actuating device comprises a tubular shaft 23 journaled in the bearing 24 in the end wall of the motor casing and extending beyond the ends of the bearing, and a second shaft 25 journaled in the tubular shaft 23 and extending beyond the ends of that shaft. Rigidly secured to the inner end of the shaft 25 is an actuating device or arm 26 having at its free end projections or fingers 27 which embrace the roller 28. Rigidly secured to the tubular shaft 23 is a thermostatic device for connecting that shaft with the actuating arm 26. As here shown, two bimetallic bars 29 are connected with the shaft 23 by a supporting member 35 and have secured to their lower ends a latch member 30 which is provided with an inwardly projecting portion or latch 33 arranged to engage a stud 32 which extends outwardly from the actuating arm 26. The outer ends of the shafts 23 and 25 are connected by spring means 43 which tends to rotate the shafts in opposite directions and to hold the latch 33 in engagement with the stud 32, thus permitting the shafts to be manually rotated in the normal operation of the switch. If the temperature within the casing becomes excessive the thermostatic elements 29 will buckle and move the latch out of engagement with the stud, thereby permitting the same to be moved by the spring means in a direction to open the switch. The field windings, the switch and the connections between the same are all enclosed in the sealed casing 15.

Motors of this type are usually designed for operation either upon a current of 110 volts or upon a current of 220 volts but in order to change from one voltage to another it is necessary to change the connections between the field windings and between those windings and the switch. In the ordinary motor it is difficult to gain access to the interior of the casing to change the connections between the leads for the field windings and this often requires a partial dismantling of the motor. In the present motor I have provided means whereby the connections between the leads are readily accessible and can be quickly and easily changed from the exterior of the casing. For this purpose I have provided the motor casing with an opening 46 which, in the present instance, is located in the end wall of the casing below the armature shaft 17. Mounted within the casing, adjacent to the inner end of the opening 46, is a terminal block 47, preferably of insulating material, and this terminal block is provided with three terminals, which comprise respectively binding posts 48, 49 and 50 arranged on and projecting from the outer face of the block. In the present arrangement, the opening 46 in the casing has at its inner end a seat in which the terminal block is supported so that the outer ends or binding posts of the terminals extend into the opening 46. The seat preferably comprises a flange 40 against which the terminal block bears, and the block is provided with a lip 41 which extends into a recess in the wall of the casing to hold the block against rotation. The terminals 48 and 49 extend through the terminal block and are connected at their inner ends with conductors 51 which lead to the switch 20. The motor is provided with conductors 52 and 53 which lead from field windings 54 and 55 to the terminal block, the windings 54 and 55 being connected one with the other. The motor is also provided with conductors 56 and 57 which lead from field windings 58 and 59 to the terminal block, the windings 58 and 59 also being connected one to the other. The terminal block has an opening 60 through which the conductors for the field windings may extend, thereby enabling them to be connected with the desired terminals on the outer side of the block. In Figs. 3 and 5 the conductors 52 and 57 are connected with the terminal 48 and the conductors 53 and 56 are connected with the terminal 49, thus providing connections for a 110 volt current. In this arrangement the terminal 50 is idle. In Figs. 4 and 6 I have shown the conductor 57 connected with the terminal 48 and the conductor 53 connected with the terminal 49 while the conductors 52 and 56 are connected with the terminal 50, which serves to connect the same one to the other, thereby providing the necessary connections for a 220 volt current.

The outer end of the opening 46 is normally closed by a removable closure which is preferably in the form of a cap or plug 61 screw threaded into the outer portion of the opening, and, in the present arrangement, this cap bears against the outer side of the terminal block. The cap is preferably hollow so that the binding posts on the terminal block may project into the same and may thus be arranged close to the outer end of the opening. It will be apparent that by removing the closure 61 the binding posts are readily accessible and the leads for the field windings may be quickly and easily changed. It will also be noted that the arrangement is such that the closure has a relatively long screw threaded connection with the casing which not only serves to prevent leakage about the closure but also provides an explosion resisting closure.

In Figs. 7 and 8 I have shown the invention as applied to a motor having a sealed casing 62 but which does not contain a switch or other controlling mechanism. One wall of this casing, in the present instance the end wall, is provided with an opening through which the line conductors are led into the casing and which is then sealed. In the present construction, a tubular conduit 63 is screw threaded into an opening in the end wall of the casing and projects a short distance outwardly beyond the same. Mounted in this conduit is a disk 64 having openings through which the line conductors extend and the conduit on the outer side of the disk is filled, for a considerable distance, with wax 65, which surrounds the conductors and tightly seals the opening through the conduit. The casing is provided with an opening 66 in which is mounted a terminal block 67 similar to that above described and having three terminals 48a, 49a and 50a. The terminals 48a and 49a, which extend through the terminal block, are directly connected with the line conductors, 67a, which extend through the sealed conduit 63. The leads 68 from the field windings extend through the terminal block at the outer side thereof and may be interchangeably connected with the terminals, as hereinbefore described.

The closure 72 for the opening 66 has a relatively wide surface contact with the wall of the casing, as shown at 69, and also has an inwardly extending boss 70 which engages the outer side of the terminal block and holds the same firmly on its seat. This closure is secured to the casing by bolts 71 which hold the surface 69 in tight contact with the wall of the casing and thereby provide an explosion resisting closure.

While I have shown and described one embodiment of my invention, together with a modification thereof, I wish it to be understood that I do not desire to be limited to the details thereof as various modifications may occur to a person skilled in the art.

Having now fully described my invention, what I claim as new and desire to secure by Letters Patent, is:

1. In an electric motor comprising a plurality of field windings, a switch to control the energization of said field windings and a casing enclosing said windings and said switch, said casing having an opening in the wall thereof, a removable closure for said opening, and means mounted in said casing adjacent to said opening to connect the field windings one with the other and with said switch, said connecting means being accessible from the exterior of said casing through said opening when said closure has been removed to enable said connections to be changed.

2. In an electric motor comprising a plurality of field windings, a switch to control the energization of said field windings and a casing enclosing said windings and said switch, said casing having an opening in the wall thereof, a removable closure for said opening, and a terminal block mounted in said casing and having means arranged adjacent to said opening to connect said field windings in different relation one with the other and with said switch.

3. In an electric motor comprising a plurality of field windings, a switch to control the energization of said field windings and a casing enclosing said windings and said switch, said casing having an opening in the wall thereof, a removable closure for said opening, and a terminal block mounted in said casing at the inner end of said opening and having a plurality of terminals, a part of said terminals having means for connecting the same with said switch and all of said terminals having means on the outer side of said terminal block for selectively connecting said terminals with said field windings.

4. In an electric motor comprising a plurality of field windings, a switch to control the energization of said field windings and a casing enclosing said windings and said switch, said casing having an opening in a wall thereof provided at its inner end with a seat and having its outer end portion provided with internal threads, a terminal block mounted on said seat, having a plurality of terminals and having an opening through which the leads for said field windings may extend, a part of said terminals having means for connecting the same with said switch and all of said terminals having means on the outer side of said terminal block for selectively connecting the leads for said field windings therewith, and a closure screw threaded into the outer portion of said opening.

5. In an electric motor comprising a plurality of primary circuits adapted to provide operation on different voltages, an explosion resisting housing, and means within said housing and accessible from the exterior thereof upon the removal of a portion of said housing for selectively connecting said circuits to correspond with the available voltage.

6. In an electric motor comprising a casing, a plurality of primary circuits in said casing, permanent line connections to said motor, means within said motor casing and accessible from the exterior thereof upon the removal of a portion of said casing for connecting said primary circuits to operate either in multiple or in series from said permanent line connections.

7. In an electrical device comprising a plurality of circuits and a casing enclosing said circuits and having an opening in the wall thereof, a removable closure for said opening, and means arranged within said casing adjacent to said opening for connecting said circuits in different relation one to the other, said connecting means being accessible from the exterior of said casing through said opening when said closure is removed.

8. In an electrical device comprising a permanent line connection, a plurality of circuits and a casing enclosing said circuits and having an opening in the wall thereof, a removable closure for said opening, and means arranged within said casing adjacent to said opening for connecting said circuits with said line connection in different relations one to the other, said connecting means being accessible from the exterior of said casing through said opening when said closure is removed.

9. In an electrical device comprising a casing, permanent line connections leading into said casing, and a plurality of circuits within said casing, said casing having an opening, means mounted within said casing and accessible through said opening for connecting said circuits and said line connections in different relations to enable said device to operate on different voltages, and a closure for said opening having a sealing surface engaging said casing, and means for securing said closure in sealing engagement with said casing.

10. In an electric motor having a plurality of windings adapted to be connected one with the other in different relations, a casing enclosing said windings and having an opening in a wall thereof, a terminal block mounted within said casing at the inner end of said opening and having a plurality of terminals accessible through said opening, said terminals having means for selectively connecting the same with said windings, and a closure detachably secured to said casing to tightly close the outer end of said opening.

11. In an electric motor having a plurality of windings adapted to be connected one with the other in different relations, a casing enclosing said windings and having an opening in a wall thereof, a terminal block mounted within said casing at the inner end of said opening and having a plurality of terminals extending into said opening, said terminals having means for selectively connecting the same with said windings, and a closure detachably secured to said casing to tightly close the outer end of said opening.

12. In an electric motor having a plurality of windings adapted to be connected one with the other in different relations, a casing enclosing said windings and having an opening in a wall thereof, a terminal block mounted within said casing at the inner end of said opening and having a plurality of terminals accessible through said opening, said terminals having means for selectively connecting the same with said winding, and a closure detachably secured to said casing at the outer end of said opening and having a part extending into said opening and having sealing contact with the wall thereof.

13. In an electric motor having a plurality of windings adapted to be connected one with the other in different relations, a casing enclosing said windings, having an opening in the wall thereof and having a seat near the inner end of said opening, a terminal block mounted on said seat and having a plurality of terminals accessible through said opening, said terminals having means for selectively connecting the same with said windings, and a closure detachably secured to said casing to tightly close said opening and having a part engaging said terminal block to hold the same on said seat.

14. In an electric motor having a plurality of windings adapted to be connected one with the other in different relations, a casing enclosing said windings, having an opening in the wall thereof and having a flange extending partially across said opening near the inner end thereof, a terminal block supported at the inner end of said opening, having a part engaging the outer face of said flange and having a plurality of terminals, said terminals having means for selectively connecting the same with said windings, and a closure detachably secured to said casing to close the outer end of said opening and having a part extending into said opening, having sealing contact with the wall thereof and engaging said terminal block to hold the same in engagement with said flange.

15. In an electric motor having a plurality of windings adapted to be connected one with the other in different relations, a casing enclosing said windings and having an opening in a wall thereof, a terminal block mounted in said opening near the inner end thereof and having a plurality of terminals on the outer side thereof and having a passageway through which conductors may be led from the interior of said casing to said terminals, and a closure detachably secured to said casing to tightly close the outer end of said opening.

16. In an electrical device comprising a plurality of circuits and a casing enclosing said circuits and having an opening in the wall thereof, a terminal block mounted within said casing adjacent to the inner end of said opening and provided with a plurality of terminals extending into said opening, said terminals having on the outer side of said terminal block means for selectively connecting the same with said circuits, and a closure detachably secured to said casing at the outer end of said opening.

GEORGE H. LELAND.